United States Patent [19]
Lindauer

[11] Patent Number: 5,678,742
[45] Date of Patent: Oct. 21, 1997

[54] IN-LINE SKATE CARRIER MOUNTABLE TO A BICYCLE

[76] Inventor: Steve Lindauer, 303 16th St., Suite 16-108, Denver, Colo. 80202-5657

[21] Appl. No.: 578,280

[22] Filed: Dec. 26, 1995

[51] Int. Cl.⁶ .................................. B62J 11/00; B62J 7/04
[52] U.S. Cl. ................... 224/454; 224/455; 224/452; 224/450; 224/448; 224/422
[58] Field of Search ............................... 224/454, 455, 224/456, 452, 460, 422, 448, 450, 425, 427; D12/407

[56] References Cited

U.S. PATENT DOCUMENTS

| | | | |
|---|---|---|---|
| 3,921,868 | 11/1975 | Reichbach | 224/455 |
| 4,760,943 | 8/1988 | Bass et al. | 224/452 |
| 5,341,971 | 8/1994 | Newbold et al. | 224/452 |

*Primary Examiner*—Linda J. Sholl
*Attorney, Agent, or Firm*—Charles C. Corbin

[57] ABSTRACT

Disclosed is a carrier, attachable to the rear frame of a bicycle, for mounting in upright position a pair of in-line roller skates of the type of skate that includes a boot, and a support frame below the boot for rotatably mounting a plurality of wheels in tandem, the carrier including framework that supports an elongate horizontal central platform, first and second relatively narrow support plates co-planar with the central platform, the first plate spaced from one side edge portion of the central platform and the second plate spaced from the other side portion of the central platform to provide a longitudinal slot on each side of the central platform for receiving respectively the wheels of one of the pair of skates and those of the other skate. Edge portions bordering each slot provide upper surfaces to engaging the lower edges of the wheel support frame of a skate to vertically support a skate, and there is a cross bar extending across each slot for functioning as a wheel chock that engages one of the downwardly opening gaps between the wheels of a skate. A resilient flexible tie-cord is used for releasably clamping the skate pair downwardly to the carrier.

18 Claims, 3 Drawing Sheets

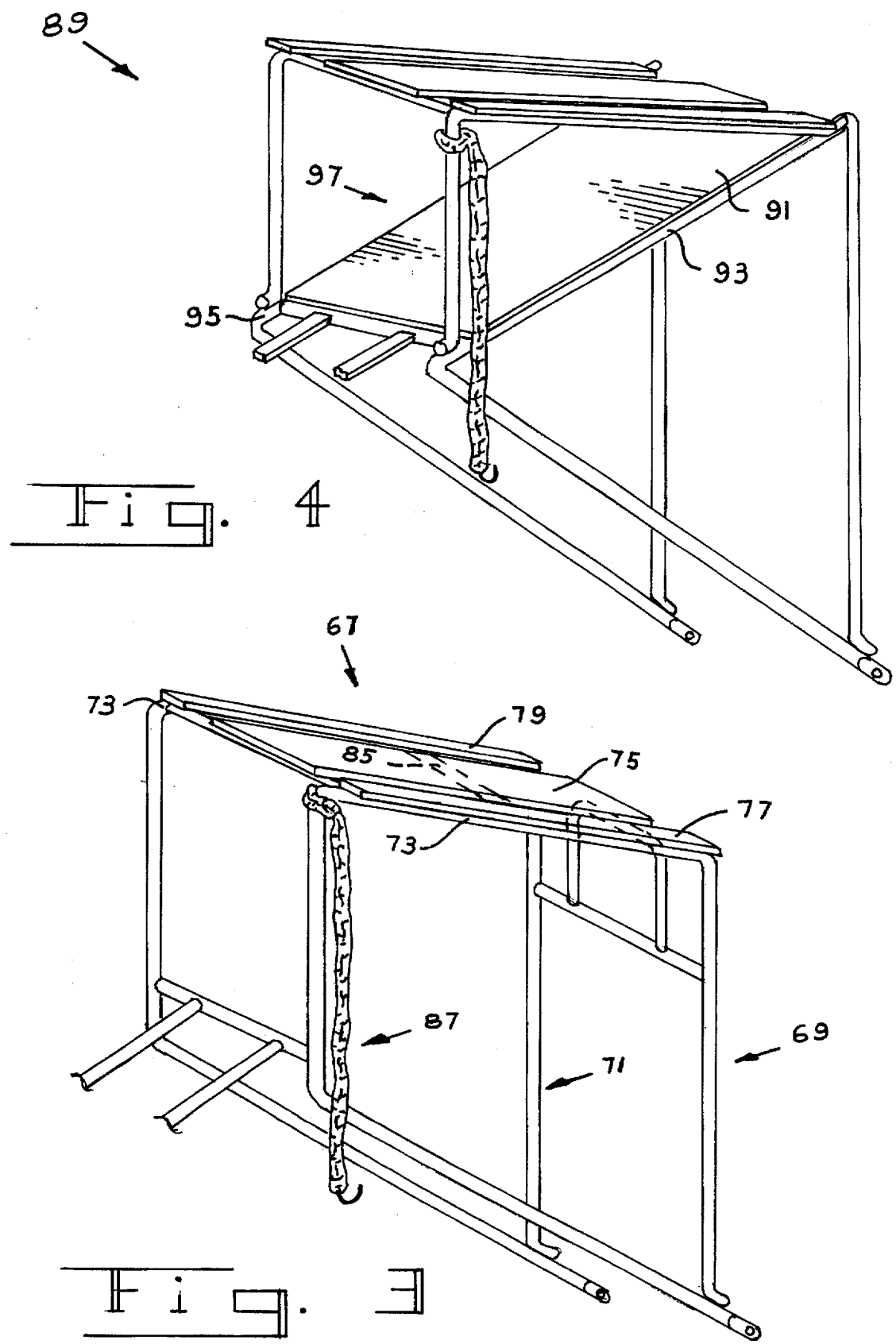

IN-LINE SKATE CARRIER MOUNTABLE TO A BICYCLE

BACKGROUND OF THE INVENTION

1. Field of the Invention

The present invention relates generally to cargo carriers adapted to be mounted on bicycles, and more particularly to such a carrier that mounts in-line skates. Such skates are generally characterized by an ankle-height boot of resilient polymeric material having interior padding, with the boot being fixedly mounted upon a chassis that commonly has four wheels mounted in a line with respect to each other, so that the weight of the user is distributed in-line in much the same fashion as on an ice-skate. Overall, an in-line skate can have dimensions similar to those of a skiing boot, thus it can be seen that in-line skates are relatively bulky items of sporting equipment.

A branch of in-line skating is the rapidly growing sport of in-line hockey. In order to get to practice sites or game sites, the players, many of whom are youngsters, would greatly benefit from a way of being able to more efficiently haul their in-line skates around. The various paraphernalia involved, such as gloves, helmets, pads, and so forth, will generally take up most of the space in a backpack or rucksack. Thus, an alternate way of carrying the players in-line skates by bicycle to the site of play is desirable. The prior art discloses no methods of specifically carrying boots in a secure fashion on a bicycle, much less in-line skates.

Rear carriers have long been known to be useful accessories for bicycles, freeing up a rider's hands for safe and efficient operation of the handlebars and the break and gear change levers while carrying a load in a convenient location behind the seat. Such carriers have been known to be useful for the transport of books, clothes, briefcases, food and tools. Unfortunately, the prior art shows no such carriers that are adapted for conveniently, effectively, and efficiently mounting in-line skates.

SUMMARY OF THE INVENTION

In view of the foregoing, it is a general object of the present invention to provide an efficient, effective, and convenient way of carrying a pair of in-line skates on a bicycle.

Another object is to provide such a carrier that has a simple, yet effective design that lends itself to economic fabrication, such that it can be made available to the general public at a relatively low cost.

A further related object is to provide such a carrier that is highly effective yet involves few structural components.

These and other objects and advantages are provided by the present invention of a carrier for an in-line skate of the type that includes a boot and a plurality of wheels mounted in spaced in-lined relationship on a chassis secured to the bottom of the boot, the chassis having downward-facing surfaces adjacent the axles of the wheels, and the wheels having a given breath, and wherein there is a downward-opening gap between adjacent ones of the wheels.

The carrier includes support framework securable to the rear frame of a bicycle, which framework includes a generally flat elongate central platform that has opposing elongate side edge portions and first and second elongate support members co-planar with the central platform, said first and second members spaced respectively from said edge portions to define a slot on each side of the central platform, each slot being just wide enough to admit therein the breath of said wheels, and upper surfaces of the central platform and the elongate members adjacent the wheel-receiving slots adapted to engage the chassis downward-facing surfaces to vertically support said skates, and the carrier also including wheel chock means extending across each of said wheel-receiving slots for engaging a wheel gap of a skate to hold the skate against longitudinal movement. Finally, there is clamping means for releasably engaging skates mounted to said carrier and urging said skates toward engagement in said slots. In a preferred embodiment said chock means is a cross bar and said clamping means include a resilient flexible cord element having opposite ends wherein at least one of said ends being releasably securable to the carrier. In yet another embodiment of the invention, the carrier is as described above except that there is no chock means.

BRIEF DESCRIPTION OF THE DRAWINGS

FIG. 3 is a perspective view of a variant embodiment of a carrier according to the present invention; and FIG. 4 is a perspective view of another embodiment of the invention.

DETAILED DESCRIPTION OF THE INVENTION

Figure 1:
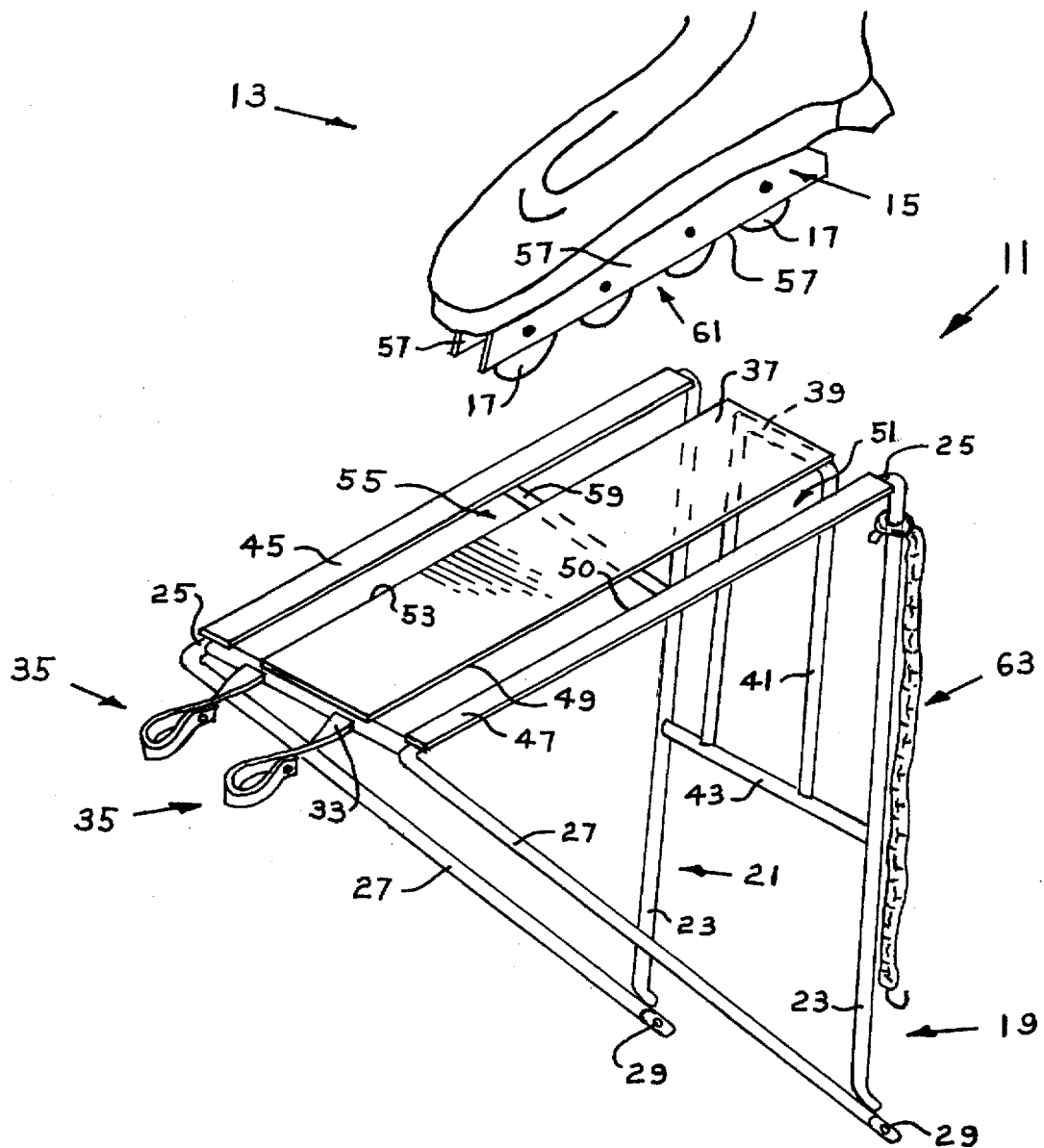
FIG. 1 is an exploded perspective view showing a preferred embodiment of an in-line skate carrier according to the present invention.
Figure 2:
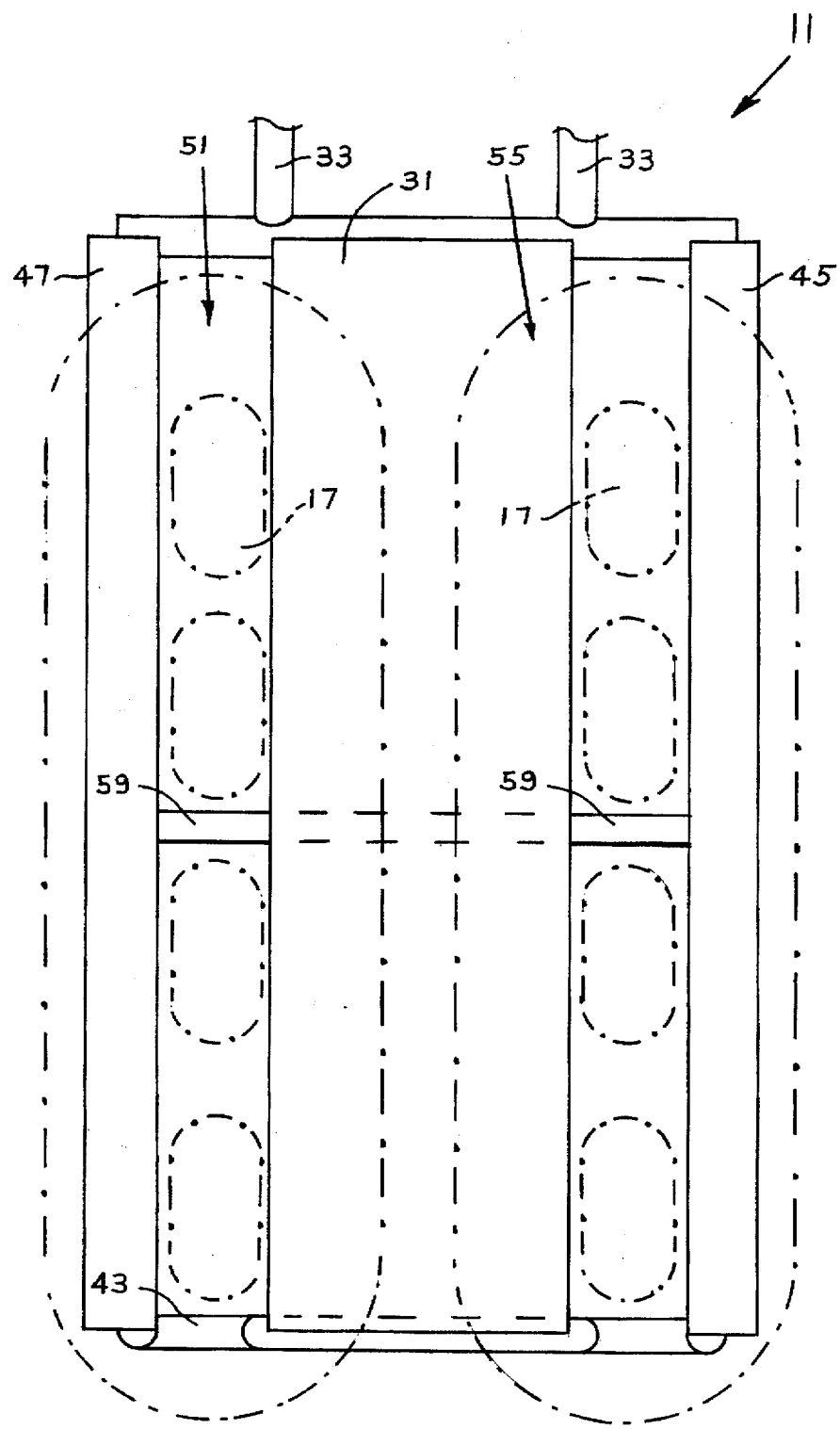
FIG. 2 is a top plan view of the carrier shown in FIG. 1.

Referring now to the drawings, FIG. 1 shows a preferred embodiment of a carrier assembly 11 according to the invention that is attachable to the rear frame of a bicycle, and which is designed to advantageously mount a pair of in-line roller skates, such as the skate 13 that includes a chassis 15 that rotatably mounts in tandem, the wheels 17.

Assembly 11 includes support framework fabricated from rod of a suitable light-weight metal such as an aluminum or magnesium alloy, using metal-bending and welding techniques well known in the metal fabrication industry. Thus it is noted that assembly 11 has laterally spaced-apart side frames 19 and 21, each frame providing a rear strut 23, an upper, generally horizontal member 25, a forward strut 27, the lower end of rear strut 23 being welded to the forward strut 27, and the flattened lower end portion of each strut 27 provided with a bolt hole 29. Each hole 29 is alignable with a bolt-receiving aperture that is customarily provided near the lower end of the rear forks (not shown) of a bicycle frame. FIG. 1 further shows that a crossbrace 31 is connected, by welding, to the forward parts of upper members 25, and a pair of connecting members 33 are welded to the crossbrace 31 and are equipped with clamping heads 35 that are designed to be secured to the upper part of the rear forks (not shown) of a bicycle frame.

FIG. 1 further shows that carrier assembly 11 features a central platform 37 having a front end welded to crossbrace 31 and a rear end supported by an inverted U-shaped bracket 41 that is affixed to crossbar 43. A first flat elongate support plate 45 is welded to the top of one upper member 25, and a second elongate support plate 47 is similarly affixed to the other upper member 25, the top surfaces of the plates 45 and 47 being co-planar with the top of the central platform 37. Preferably the lengths of components 37, 45 and 47 are greater than the length of a skate chassis 15.

One long edge 49 of platform 37 is spaced parallel to an opposing edge 50 of the plate 47, by a distance that is slightly wider than the width of wheels 17, and forms a wheel-receiving slot 51, and the plate 45 is similarly spaced from the other long edge 53 of platform 37 to provide a second wheel-receiving slot 55. It is further noted that the width of such slot is such that downward facing lower surfaces 57 of the chassis 15 of skate 13 will abut upper surfaces of platform 37 and plate 47 to vertically support skate 13 when its wheels are engaged in slot 51 in the manner suggested by FIG. 1.

Note also in FIG. 1 that there is a wheel-chock member 59 welded to the struts 25 and bridging the slots 51 and 55. It is designed to engage a gap between adjourning skate wheels 17, and in the embodiment shown will engage the middle gap 61 of skate 13 when skate 13 is mounted to carrier 11 in a manner to be described. Finally it is noted that there is an elastic tie cord 63 having one end secured to a convenient location on the upper framework of carrier 11 and a free end equipped with a hook.

When carrier 11 has been installed on the rear frame of a bicycle (not shown) using attachment structure described above, a pair of in-line skates can be easily mounted to carrier 11 by engaging the wheels of one skate in slot 51, the wheels of the second skate in slot 55, the middle wheel gap of each skate straddling the chock 59, and the skate chassis abutting the carrier in the fashion mentioned above. The tie-cord 63 can then be maneuvered over the boot pair and connected to the other side of the carrier frame so as to clamp the boot pair in place by urging it downwardly into engagement with the carrier upper surfaces. The chock 59 engages wheel gaps 61 to prevent longitudinal shifting of the skates along the wheel-receiving slots 51 and 55.

FIG. 3 illustrates a variant 67 of the invention that employs opposed side frames 69 and 71 that feature upper members 73 that are substantially inclined with respect to the horizontal. A central platform 75 and side plates 77 and 79 are like the corresponding components of the above-described embodiment 11 and provide wheel-receiving slots 81 and 83. There is also a wheel chock 85 and a tie-cord 87.

FIG. 4 shows yet another variant 89 according to the invention. It has a skate-supporting portion that is inclined to the horizon and structured like that of the previously described embodiment 67. In addition it is noted that a generally horizontal plate 91 of thin gage metal is secured to the frame members 93 and 95 to provide a general purpose storage compartment 97. It is noted that the invention also contemplates variants (not shown) that are structured similarly to the above-described embodiments, except that no wheel chocks are employed.

While particular embodiments of the invention have been described, it is not intended that the invention be limited thereto since various modifications and variations may readily occur to those of ordinary skill in the art given the benefit of this disclosure. Thus, it is intended that the invention include all such variations, and be given the full scope and breadth as defined in the claims which follow.

What is claimed is:

1. A carrier assembly for an in-line skate of the type that includes a boot and a plurality of wheels mounted and spaced in in-line relationship on a chassis secured to the bottom of said boot, said chassis having a lower edge, said wheels having a given breadth, and wherein there is a downwardly-opening gap between adjacent ones of said wheels, and said assembly adapted for attachment to the frame of a bicycle, and comprising:

a. support framework securable to the frame of a bicycle, including a generally flat elongate central platform that has opposing elongate side edge portions and first and second elongate support members co-planar with the central platform, said first and second members spaced respectively from said opposing side edge platform portions to define a wheel-receiving slot that is just wide enough to admit therein the breadth of said wheels, said platform and support members having upper surfaces adapted to engage said chassis' lower edge to vertically support said skate;

b. wheel chock means extending transversely across said wheel-receiving slot for engaging said downwardly-opening wheel gap; and c. clamping means mounted to said support framework for releasably engaging at least one skate mounted on said carrier with wheels engaged in said slot, for resiliently urging and clamping said skate into engagement with said upper surfaces.

2. A carrier assembly as defined in claim 1 wherein said platform and support members are generally horizontal.

3. A carrier assembly as defined in claim 1 wherein said platform and support members are inclined at a substantial acute angle to the horizon.

4. A carrier as defined in claim 2 wherein said chock means comprises a cross bar.

5. A carrier as defined in claim 4 wherein said wheel-engaging slot has a front end and a rear end, and said cross bar is positioned midway between said slot ends.

6. A carrier as defined in claim 3 including a horizontal support platform supported by said framework below said inclined platform.

7. A carrier as defined in claim 1 wherein said clamping means includes at least one resilient flexible cord element having opposite ends, at least one of said opposite ends being releasably securable to said support framework.

8. A carrier as defined in claim 1, wherein said clamping means includes at least one substantially rigid skate hold-down means for limiting the movement of said skate in said carrier.

9. A carrier as defined in claim 1, wherein each wheel-receiving slot defines a slot of suitable dimension so as to receive one or more of the in-line wheels of an in-line skate.

10. A carrier as defined in claim 1, wherein said wheel-receiving slot, wheel chock, and support means comprise an integrally molded unit.

11. A carrier assembly for an in-line skate of the type that includes a boot and a plurality of wheels mounted and spaced in in-line relationships on a chassis secured to the bottom of said boot, said chassis having a lower edge, said wheels having a given breadth, and wherein there is a downwardly opening gap between adjacent ones of said wheels, and said assembly adapted for attachment to the frame of bicycle, comprising:

a. support framework securable to the frame of a bicycle, including a generally flat elongate central platform that has opposing elongate side edge portions and first and second elongate support members co-planar with the central platform, said first and second members spaced respectively from said opposing side edge platforms to define a wheel-receiving slot that is just wide enough to admit therein the breadth of said wheels, said platform and support members having upper surfaces adapted to engage said chassis' lower edge to vertically support said sake; and b. clamping means mounted to said support framework for releasably engaging at least one skate mounted on said carrier with wheels engaged in said slot for resiliently securing and clamping said skate into engagement with said surfaces.

12. A carrier assembly as defined in claim 11, wherein said platform and support members are generally horizontal.

13. A carrier assembly as defined in claim 11, wherein said platform and support members are inclined at a substantial angle.

14. A carrier as defined in claim 12, including a horizontal support platform supported by said framework below said substantial angled platform.

15. A carrier as defined in claim 11, wherein said clamping means includes at least one resilient flexible cord element having opposite ends, at least one of said opposite ends being releasably securable to said support framework.

16. A carrier as defined in claim 11, wherein said clamping means includes at least one substantially rigid skate hold-down means for limiting the movement of said skate in said carrier.

17. A carrier as defined in claim 11, wherein each wheel-receiving slot defines a slot of suitable dimension so as to receive one or more of the in-line wheels of an in-line skate.

18. A carrier as defined in claim 11, wherein said wheel-receiving slot, and support means comprise an integrally molded unit.

* * * * *